United States Patent
Shimotashiro et al.

(10) Patent No.: US 8,661,357 B2
(45) Date of Patent: Feb. 25, 2014

(54) ELECTRONIC DEVICE SYSTEM

(75) Inventors: Masafumi Shimotashiro, Osaka (JP);
Kentaro Tanikawa, Osaka (JP);
Masakazu Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 858 days.

(21) Appl. No.: 11/791,965

(22) PCT Filed: Jan. 27, 2006

(86) PCT No.: PCT/JP2006/001808
§ 371 (c)(1),
(2), (4) Date: May 31, 2007

(87) PCT Pub. No.: WO2006/098095
PCT Pub. Date: Sep. 21, 2006

(65) Prior Publication Data
US 2008/0126965 A1    May 29, 2008

(30) Foreign Application Priority Data
Mar. 17, 2005   (JP) .................................. 2005-076801

(51) Int. Cl.
*G06F 3/048* (2013.01)
(52) U.S. Cl.
USPC ........................................................ 715/764
(58) Field of Classification Search
USPC ................ 715/764, 808, 810; 707/10; 725/40
See application file for complete search history.

(56) References Cited

U.S. PATENT DOCUMENTS

| | | | |
|---|---|---|---|
| 5,648,813 A * | 7/1997 | Tanigawa et al. | 725/139 |
| 6,118,442 A | 9/2000 | Tanigawa | |
| 6,219,839 B1 * | 4/2001 | Sampsell | 725/40 |
| 6,229,539 B1 * | 5/2001 | Morcos et al. | 715/808 |
| 6,348,956 B1 | 2/2002 | Tanigawa et al. | |
| 6,421,069 B1 | 7/2002 | Ludtke et al. | |
| 6,507,696 B1 * | 1/2003 | Chung et al. | 386/125 |
| 6,661,437 B1 * | 12/2003 | Miller et al. | 715/810 |
| 2002/0019984 A1 * | 2/2002 | Rakib | 725/111 |
| 2002/0046209 A1 * | 4/2002 | De Bellis | 707/10 |
| 2002/0047866 A1 * | 4/2002 | Matsumoto et al. | 345/810 |

(Continued)

FOREIGN PATENT DOCUMENTS

| | | |
|---|---|---|
| JP | 7-177586 | 7/1995 |
| JP | 2001-125864 | 5/2001 |

(Continued)

*Primary Examiner* — Enrique Iturralde
(74) *Attorney, Agent, or Firm* — Wenderoth, Lind & Ponack, L.L.P.

(57) ABSTRACT

An electronic device system with improved user convenience that is capable of controlling plural electronic devices connected via a network or the like from any of such electronic devices. The electronic device system according to the present invention is composed of: a first electronic device that includes a first manipulation information sending unit that sends, to a second electronic device, first manipulation information that is information for causing the first electronic device to operate, a first manipulation information receiving unit that receives, from the second electronic device, second manipulation information that is information for causing the second electronic device to operate, and a first manipulation information accumulation unit that accumulates the second manipulation information; and a second electronic device that includes a second manipulation information sending unit that sends the second manipulation information to the first electronic device, a second manipulation information receiving unit that receives the first manipulation information from the first electronic device and a second manipulation information accumulation unit that accumulates the first manipulation information.

11 Claims, 11 Drawing Sheets

(56) References Cited

U.S. PATENT DOCUMENTS

| | | |
|---|---|---|
| 2002/0047945 A1 | 4/2002 | Tanigawa et al. |
| 2003/0106066 A1* | 6/2003 | Sakai .......................... 725/105 |
| 2007/0016877 A1* | 1/2007 | Shirakawa et al. ........... 715/810 |

FOREIGN PATENT DOCUMENTS

| | | |
|---|---|---|
| JP | 2001-512297 | 8/2001 |
| JP | 2002-315072 | 10/2002 |
| JP | 2003-029895 | 1/2003 |

* cited by examiner

FIG. 4

```xml
<menu>
<menu title>television</menu title>
  <IP address>192. 168. 1. 45</IP address>
    <item>
        <button>channel up</button>
        <command>channel_UP</command>
    </item>
    <item>
        <button>channel down</button>
        <command>channel_DOWN</command>
    </item>
    <item>
        <button>turn up volume</button>
        <command>volume_UP</command>
    </item>
    <item>
        <button>turn down volume</button>
        <command>volume_DOWN</command>
    </item>
    <item>
        <button>mute</button>
        <command>mute_SWITCH</command>
    </item>
    <item>
        <button>power on/off</button>
        <command>power_SWITCH</command>
    </item>
</menu>
```

FIG. 5

```
<menu>
<menu title>DVD recorder</menu title>
  <IP address>192. 168. 1. 55</IP address>
    <item>
       <button>Record</button>
       <command>record_START</command>
    </item>
    <item>
       <button>stop recording</button>
       <command>record_STOP</command>
    </item>
    <item>
       <button>Play</button>
       <command>play_START</command>
    </item>
    <item>
       <button>stop playback</button>
       <command>play_STOP</command>
    </item>
    <item>
       <button>forward</button>
       <command>forward</command>
    </item>
    <item>
       <button>rewind</button>
       <command>rewind</command>
    </item>
    <item>
       <button>power on/off </button>
       <command>power_SWITCH</command>
    </item>
</menu>
```

FIG. 7

```xml
<menu>
<menu title>television</menu title>
  <IP address>192. 168. 1. 45</IP address>
    <item>
       <button>channel up</button>
       <command>channel_UP</command>
    </item>
    <item>
       <button>channel down</button>
       <command>channel_DOWN</command>
    </item>
    <item>
       <button>turn up volume</button>
       <command>volume_UP</command>
    </item>
    <item>
       <button>turn down volume</button>
       <command>volume_DOWN</command>
    </item>
    <item>
       <button>mute</button>
       <command>mute_SWITCH</command>
    </item>
    <item>
       <button>power on/off</button>
       <command>power_SWITCH</command>
    </item>
</menu>
<menu>
<menu title>DVD recorder</menu title>
  <IP address>192. 168. 1. 55</IP address>
    <item>
       <button>Record</button>
       <command>record_START</command>
    </item>
    <item>
       <button>stop recording</button>
       <command>record_STOP</command>
    </item>
    <item>
       <button>Play</button>
       <command>play_START</command>
    </item>
    <item>
       <button>stop playback</button>
       <command>play_STOP</command>
    </item>
    <item>
       <button>forward</button>
       <command>forward</command>
    </item>
    <item>
       <button>rewind</button>
       <command>rewind</command>
    </item>
    <item>
       <button>power on/off </button>
       <command>power_SWITCH</command>
    </item>
</menu>
```

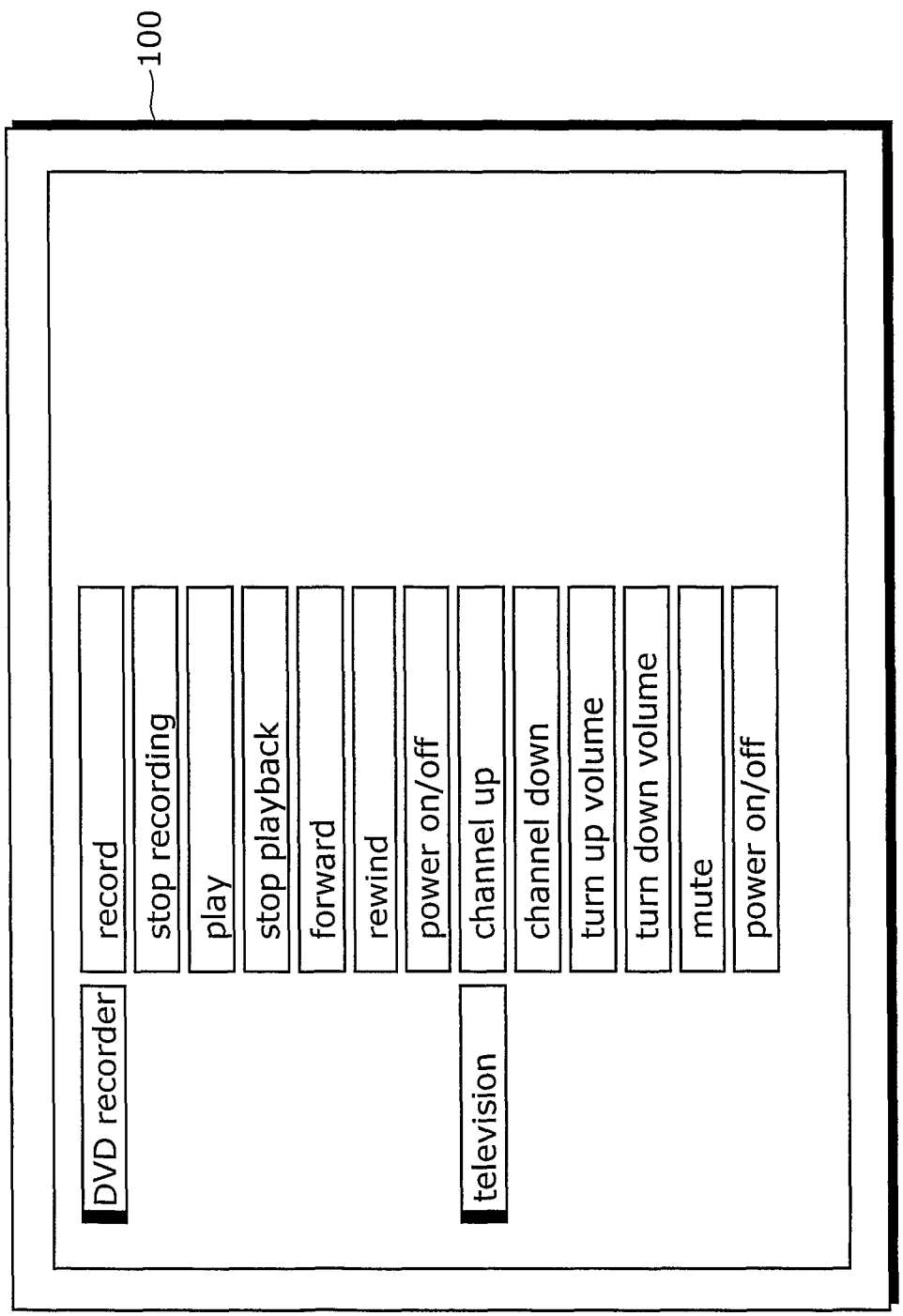

ELECTRONIC DEVICE SYSTEM

TECHNICAL FIELD

The present invention relates to an electronic device system that includes plural electronic devices connected via a network or the like.

BACKGROUND ART

Conventional electronic device systems include a system in which one electronic device receives menu information of another electronic device connected via a network or the like, and merges such received menu information with its own menu information (for example, refer to Japanese Laid-Open Patent Application No. 07-177586 (page 1, FIG. 1, and the like) and Japanese Laid-Open Patent Application No. 2003-029895 (page 1, FIG. 1, and the like)). Such electronic device system is capable of controlling another electronic device connected, using such merged menu information.

However, in the above-mentioned electronic device system, in the case where it is not possible to manipulate the electronic device having the merged menu due to reasons such as that the electronic device is in power-off state and that its remote control device is lost, it is necessary to manipulate the electronic devices in the system individually, which results in a problem of poor user, convenience. The above-mentioned electronic device system also has a problem of poor operability since the structures or the like of the manipulation menus of the respective electronic devices are not uniform.

DISCLOSURE OF INVENTION

In view of the above-mentioned problem, the present invention aims at providing an electronic device system with improved user convenience that is capable of controlling plural electronic devices connected via a network or the like from any of such electronic devices.

In order to achieve this object, the electronic device system according to the present invention is an electronic device system including: a plurality of electronic devices that communicate with each other, each of the electronic devices including: a manipulation menu display preparation unit that prepares a manipulation menu of any other of the electronic devices; an operation instruction accepting unit that accepts, from an input device, an instruction directed to the manipulation menu prepared by the manipulation menu display preparation unit; and an operation instruction information sending unit that sends, to any other of the electronic devices, an operation instruction information for causing any other of the electronic devices to perform an operation corresponding to the instruction accepted by the operation instruction accepting unit.

This structure makes it possible to control the manipulation of the first electronic device and the second electronic device connected via a network or the like from any of the first electronic device and the second electronic device. Thus, even in the case where one of the electronic devices cannot be directly controlled, it becomes possible to control such device from the Other electronic device.

Furthermore, in the electronic device system, each of the electronic devices may further include: an item information accumulation unit that accumulates a first item information and a second item information, the first item information indicating a menu item in the manipulation menu of any other of the electronic devices, and the second item information indicating a menu item in the manipulation menu of the self electronic device; wherein the manipulation menu display preparation unit may merge the first item information and the second item information accumulated in the item information accumulation unit, and prepare a manipulation menu corresponding to the merged item information.

This structure makes it possible to manipulate both of two electronic devices from any of such devices via the same interface. This eliminates the user's trouble of having to remember a new manipulation method every time an electronic device to be manipulated changes, and thus allows such user to manipulate the electronic device in an intuitive manner with the same familiar operational feeling.

Furthermore, in the electronic device system, the item information sending unit may send the first item information to any other of the electronic devices when the self electronic device is activated or when a request to send the first item information is accepted.

This structure makes it possible to control plural electronic devices connected via a network or the like from any of such electronic devices, without requiring the user to perform a special setting.

Note that it is not only possible to embody the present invention as an electronic device system, but also as: an electronic device constituting the electronic device system; an electronic device control method that includes, as its steps, the processing units making up the electronic device; a computer program that causes a computer to execute these steps; and a computer-readable storage medium, such as a CD-ROM, on which such program is stored.

According to the electronic device system of the present invention, it becomes possible to control plural electronic devices connected via a network or the like from any of such electronic devices, and thus to provide an electronic device system with improved user convenience.

The disclosure of Japanese Patent Application No. 2005-076801 filed on Mar. 17, 2005 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 4 is a diagram showing the data structure of manipulation information in the electronic device system;

FIG. 5 is a diagram showing the data structure of manipulation information in the electronic device system;

FIG. 7 is a diagram showing the data structure of manipulation information in the electronic device system;

FIG. 11 is a diagram showing an example display of a manipulation menu in the electronic device system.

BEST MODE FOR CARRYING OUT THE INVENTION

The following describes a preferred embodiment of the electronic device system and the like of the present invention with reference to the drawings. Note that in the embodiment, components and steps assigned with the same reference numbers are intended for the same operations, and therefore their descriptions are not repeated in some cases.

Figure 1:
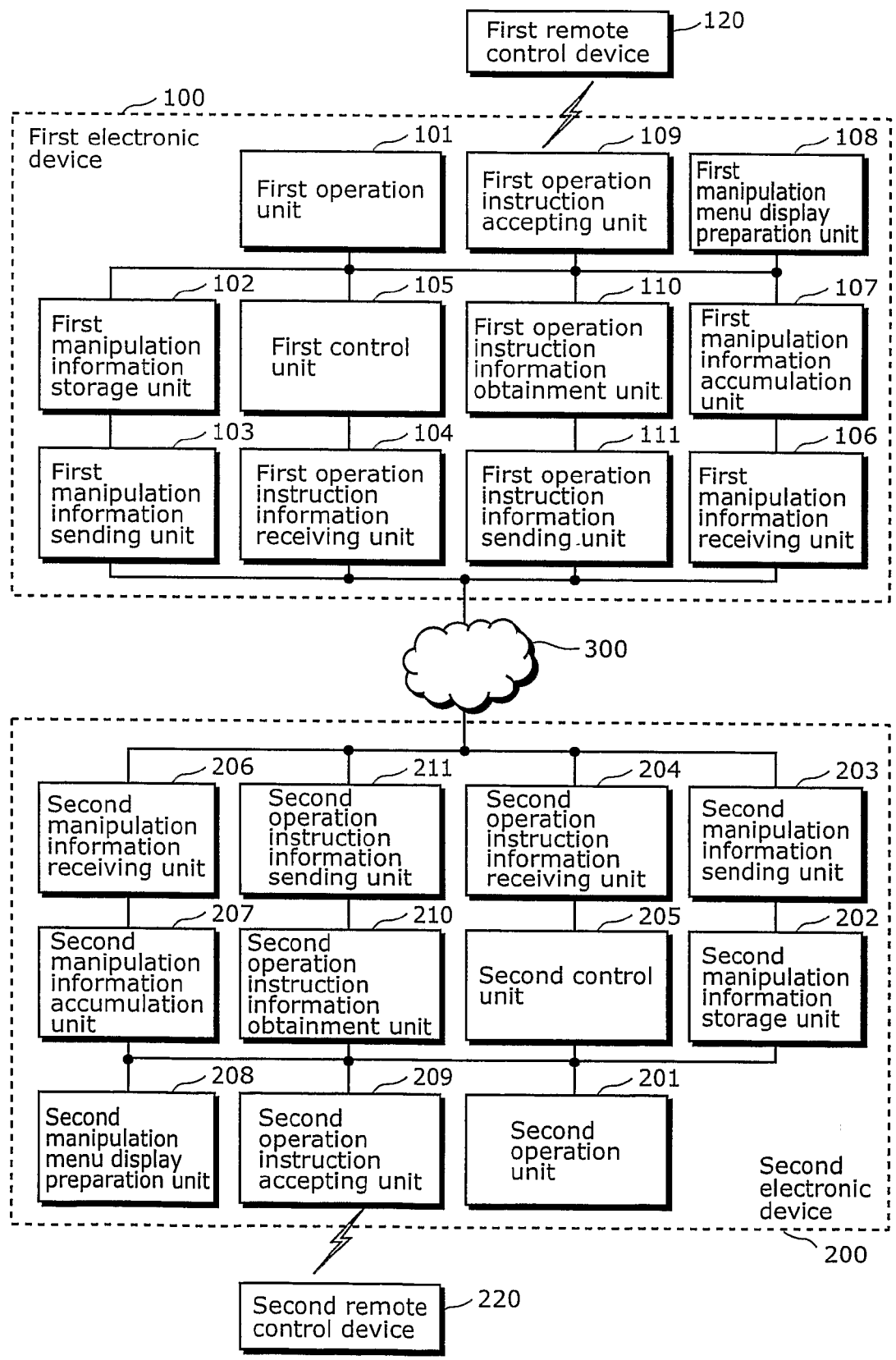
FIG. 1 is a block diagram showing the structure of an electronic device system according to an embodiment of the present invention.

FIG. 1 is a block diagram showing the structure of the electronic device system according to one embodiment of the present invention. The electronic device system according to the present embodiment includes a first electronic device 100 and a second electronic device 200. The first electronic device 100 and the second electronic device 200 are connected via a network 300.

The first electronic device 100 includes a first operation unit 101, a first manipulation information storage unit 102, a first manipulation information sending unit 103, a first operation instruction information receiving unit 104, a first control unit 105, a first manipulation information receiving unit 106, a first manipulation information accumulation unit 107, a first manipulation menu display preparation unit 108, a first operation instruction accepting unit 109, a first operation instruction information obtainment unit 110, and a first operation instruction information sending unit 111.

The second electronic device 200 includes a second operation unit 201, a second manipulation information storage unit 202, a second manipulation information sending unit 203, a second operation instruction information receiving unit 204, a second control unit 205, a second manipulation information receiving unit 206, a second manipulation information accumulation unit 207, a second manipulation menu display preparation unit 208, a second operation instruction accepting unit 209, a second operation instruction information obtainment unit 210, and a second operation instruction information sending unit 211.

The first electronic device 100 may be any electronic device as long as it is capable of being connected to another device via a network or the like. For example, the first electronic device 100 may be an Audio-Video device such as a television, a DVD player, a DVD recorder, a hard disk recorder, a video tape recorder, and a CD player, or may be a home appliance such as a refrigerator, a washing machine, an air-conditioner, and a lighting device.

The first operation unit 101 is an example of the operation unit that performs a predetermined operation. In the present embodiment, the first operation unit 101 performs a predetermined operation based on a control signal from the first control unit 105. For example, the "predetermined operation" is an operation or the like to receive radio frequencies and display video in the case where the first electronic device 100 is a television, whereas it is an operation or the like to read a video signal and an audio signal from a DVD disc and output such signals in the case where the first electronic device 100 is a DVD player. In general, the first operation unit 101 can be implemented as an MPU, a memory, and the like. The operation of the first operation unit 101 is implemented, in general, as software, and such software is stored in a storage medium such as a ROM. Note, however, that the operation of the first operation unit 101 may also be implemented as hardware such as a dedicated circuit.

The first manipulation information storage unit 102 is an example of one of the following: the item information accumulation unit that accumulates a second item information indicating a menu item in the manipulation menu of the self electronic device; and the first item information accumulation unit that accumulates a first item information indicating a menu item in the manipulation menu of the self electronic device. In the present embodiment, the first manipulation information storage unit 102 stores manipulation information which is information for causing the first electronic device 100 to operate (hereinafter referred to as a "first manipulation information"). To be more specific, the first manipulation information includes two or more pieces of manipulation item information, each being information for causing the first electronic device 100 to operate. Each manipulation item information includes: item information indicating an item of the manipulation menu; and operation instruction information for instructing that an operation of the first electronic device 100 corresponding to such item should be performed. An example of item information is information indicating an item of the manipulation menu such as "channel up" and "turn down volume" in the case where the first electronic device 100 is a television, whereas it is information indicating an item of the manipulation menu such as "play" and "stop" in the case where the first electronic device 100 is a DVD player. Another example of the item information is information indicating a position of an item in the manipulation menu. An example of operation instruction information is a command or the like for causing the first operation unit 101 to perform the operation indicated by the corresponding item of the manipulation information. Note that manipulation item information may include only one of item information and operation instruction information. Also note that the first manipulation information may include information to identify the first electronic device. The first manipulation information may be in any form as long as it includes manipulation item information. For example, the first manipulation information may be data in the XML format, or may be data in tabular form. Furthermore, the data structures of the first manipulation information, manipulation item information, item information, and operation instruction information may be any structures. As for the first manipulation information storage unit 102, it is preferably a non-volatile storage medium such as a ROM and an optical disc, but it may also be a volatile storage medium.

The first manipulation information sending unit 103 is an example of one of the following: the operation instruction information sending unit that sends, to any other of the electronic devices, a second item information indicating a menu item in the manipulation menu of the self electronic device; and the item information sending unit that sends, to any other of the electronic devices, a first item information indicating a menu item in the manipulation menu of the self electronic device. In the present embodiment, the first manipulation information sending unit 103 sends the first manipulation information stored in the first manipulation information storage unit 102 to the second electronic device 200. The first manipulation information may be sent in response to any trigger or at any timing. The first manipulation information sending unit 103 may send the first manipulation information to the second electronic device 200 in the case of receiving any of the following: a user instruction such as an instruction to send the first manipulation information and an instruction to display the manipulation menu; and a request from the second electronic device 200 to send the first manipulation information. The first manipulation information sending unit 103 may also send the first manipulation information immediately after the first electronic device 100 recognizes that a connection with the second electronic device 200 has been established, such as the following timings: immediately after the first electronic device 100 and the second electronic device 200 are connected; and immediately after the second electronic device 200 is powered on. Note that the expression "immediately after" covers the case where there is some degree of delay after the point on time when a connection between the first electronic device 100 and the second electronic device 200 is recognized. Furthermore, the first manipulation information sending unit 103 may also send the first manipulation information either on a regular or irregular basis. The first manipulation information sending unit 103 may or may not include a sending device, such as a modem and a network card, for sending information. The first manipulation information sending unit 103 may be implemented as hardware or as software, such as a driver, for driving the sending device. The first manipulation information sending unit 103 may be implemented as: a communication means/device such as a LAN; an infrared communication; a short-range wireless communication means/device such as Bluetooth (registered trademark); an e-mail sending means/device; or the like.

The first operation instruction information receiving unit 104 is an example of the operation instruction information receiving unit that receives operation instruction information from any other of the electronic devices. In the present embodiment, the first operation instruction information receiving unit 104 receives, from the second electronic device 200, operation instruction information which is information for instructing the first operation unit 101 to perform a specified operation. The first operation instruction information receiving unit 104 may or may not include a receiving device, such as a modem and a network, for receiving information. The first operation instruction information receiving unit 104 may be implemented as hardware or as software, such as a driver, for driving the receiving device. The first operation instruction information receiving unit 104 may be implemented as: a communication means/device such as a LAN; an infrared communication; a short-range wireless communication means/device such as Bluetooth (registered trademark); an e-mail sending means/device; or the like.

The first control unit 105 is an example of the control unit that causes the first operation unit 101 to operate according to the received operation instruction information. In the present embodiment, the first control unit 105 causes the first operation unit 101 to operate based on the operation instruction information received by the first operation instruction information receiving unit 104. More specifically, the first control unit 105 outputs, to the first operation unit 101, a control signal corresponding to the received operation instruction information, so as to cause the first operation unit 101 to perform the operation as instructed by the operation instruction information. The first control unit 105 can be implemented as an MPU, a memory, and the like. The operating procedures of the first control unit 105 are implemented, in general, as software, and such software is stored in a storage medium such as a ROM. Note, however, that the operating procedures of the first control unit 105 may also be implemented as hardware such as a dedicated circuit.

The first manipulation information receiving unit 106 is an example of the item information receiving unit that receives, from any other of the electronic devices, a second item information indicating a menu item in the manipulation menu of any other of the electronic devices. In the present embodiment, the first manipulation information receiving unit 106 receives, from the second electronic device 200, manipulation information which is information for causing the second electronic device 200 to operate (hereinafter referred to as a "second manipulation information). This second manipulation information is the same as the above-described first manipulation information, excluding that the first and second manipulation information are intended for causing different devices. The first manipulation information receiving unit 106 may or may not include a receiving device, such as a modem and a network, for receiving information. The first manipulation information receiving unit 106 may be implemented as hardware or as software, such as a driver, for driving the receiving device. The first manipulation information receiving unit 106 may be implemented as: a communication means/device such as a LAN; an infrared communication; a short-range wireless communication means/device such as Bluetooth (registered trademark); an e-mail sending means/device; or the like.

The first manipulation information accumulation unit 107 is an example of one of the following: the item information accumulation unit that accumulates a first item information and a second item information, the first item information indicating a menu item in the manipulation menu of any other of the electronic devices, and the second item information indicating a menu item in the manipulation menu of the self electronic device; and the second item information accumulation unit that accumulates the received second item information indicating a menu item in the manipulation menu of any other of the electronic devices. In the present embodiment, the first manipulation information accumulation unit 107 accumulates, in a storage medium such as a memory, the second manipulation information received by the first manipulation information receiving unit 106. The first manipulation information accumulation unit 107 may accumulate the second manipulation information as it is or may accumulate manipulation information that is obtained by merging the first manipulation information with the second manipulation information (such manipulation information is hereinafter referred to as "merged manipulation information"). In the latter case, the first manipulation information and the second manipulation information may be merged in any way. For example, they may be merged by simply attaching the contents of the second manipulation information after the contents of the first manipulation information, or may be merged after sorting the order of arranging pieces of manipulation item information included in the first manipulation information and second manipulation information in, for example, alphabetical order, or the like. The first manipulation information and second manipulation information may also be merged in a manner that at least part of the first manipulation information and second manipulation information is deleted or undisplayed. When the first manipulation information and second manipulation information are merged, a predetermined merge rule concerning shape may be applied, such as how the shape of a menu button or the like is selected. Furthermore, a merge rule concerning operation may be applied. An example of the merge rule concerning operation is that, in the case where there is an instruction to perform a video recording operation, the recording should be carried out after always shifting the control from a television to a video device. In other words, in the case where an instruction is related to an operation of the video device, such rule defines, as pre-processing, that the operation of shifting the control to the video device must be performed first. In the case where there is an instruction to play video, such processing may be defined as the one for shifting the destination of a signal for television display to an external input terminal connected to an output of the video device. The first manipulation information accumulation unit 107 may or may not include a storage medium such as a memory. In the case where the first manipulation information accumulation unit 107 does not include any storage media, it may utilize another storage medium or the like. The first manipulation information accumulation unit 107 can be implemented as an MPU, a memory, and the like.

The first manipulation menu display preparation unit 108 is an example of the following: the manipulation menu display preparation unit that prepares a manipulation menu of any other of the electronic devices; and the display device for displaying the prepared manipulation menu. In the present embodiment, the first manipulation menu display preparation unit 108 prepares and displays the manipulation menu based on the manipulation item information included in the second manipulation information accumulated by the first manipulation information accumulation unit 107. The first manipulation menu display preparation unit 108 may prepare and display all or only some of the manipulation item information included in the second manipulation information. The manipulation menu may be prepared and displayed in any form such as a list form or as buttons. The manipulation menu may be prepared and displayed as a menu with a hierarchical structure. In the case where the manipulation item information included in the second manipulation information and the manipulation item information included in the first manipulation information are accumulated in merged form, a manipulation menu that is based on such merged manipulation information may be prepared and displayed. Furthermore, it is also possible that the first manipulation menu display preparation unit 108 merges the first manipulation information with the second manipulation information at the time of display, and prepares and displays a manipulation menu based on such merged manipulation information. The first manipulation menu display preparation unit 108 may or may not include a display device such as a display. The first manipulation menu display preparation unit 108 may prepare and output, to another display device, information for displaying the manipulation menu. The first manipulation menu display preparation unit 108 can be implemented as driver software for display device, or may be made up of a display device, driver software, and an output device, or the like.

The first operation instruction accepting unit 109 is an example of the operation instruction accepting unit that accepts, from an input device, an instruction directed to the prepared manipulation menu. In the present embodiment, the first operation instruction accepting unit 109 accepts an operation instruction that is an instruction to cause the second electronic device 200 to operate. More specifically, the first operation instruction accepting unit 109 accepts an operation instruction by the selection of an item of the manipulation menu displayed on the first manipulation menu display preparation unit 108. An operation instruction is accepted, for example, by the selection of a menu item using a remote control device and by the selection of a menu item on a touch panel equipped to the first manipulation menu display preparation unit 108 or the like. Information that is selected by the press of a hard button equipped to the first electronic device 100 may also be accepted as an operation instruction. The first operation instruction accepting unit 109 may accept an input through any input means/device such as a remote control device, a touch panel, a hard button, a ten key pad, a keyboard, and a mouse. Note that the present embodiment is described by taking, as an example, the case where an operation instruction is accepted from a first remote control device 120. The first operation instruction accepting unit 109 can be implemented as a device driver for input means/device such as a remote control device, a touch panel, and a hard button, or as software or the like for controlling menu screen.

The first operation instruction information obtainment unit 110 obtains operation instruction information included in the second manipulation information accumulated in the first manipulation information accumulation unit 107, based on the operation instruction accepted by the first operation instruction accepting unit 109. More specifically, the first operation instruction information obtainment unit 110 obtains the operation instruction information, included in the second manipulation information accumulated in the first manipulation information accumulation unit 107, corresponding to a menu item selected by the first operation instruction accepting unit 109. The first operation instruction information obtainment unit 110 can be implemented as an MPU, a memory, and the like.

The first operation instruction information sending unit 111 is an example of the operation instruction information sending unit that sends, to any of the other electronic devices, an operation instruction information for causing any of the other electronic devices to perform an operation corresponding to the accepted instruction. In the present embodiment, the first operation instruction information sending unit 111 sends, to the second electronic device 200, the operation instruction information obtained by the first operation instruction information obtainment unit 110. The first operation instruction information sending unit 111 may or may not include a sending device, such as a modem and a network card, for sending information. The first operation instruction information sending unit 111 may be implemented as hardware or as software, such as a driver, for driving the sending device. The sending of the first operation instruction information sending unit 111 may be implemented as: a communication means/device such as a LAN; an infrared communication; a short-range wireless communication means/device such as Bluetooth (registered trademark); an e-mail sending means/device; or the like.

The first remote control device 120 is an example of the input device. In the present embodiment, the first remote control device 120 is intended for manipulating the first electronic device 100. More specifically, the remote control device 120 outputs a signal for controlling the first electronic device 100 according to a user instruction or the like. For example, the first remote control device 120 includes plural buttons and an instruction means/device, or the like, and outputs a signal for selecting a menu item of the manipulation menu displayed on the first manipulation menu display preparation unit 108, depending on how such plural buttons and instruction means/device are manipulated. The first remote control device 120 is implemented as a communication means/device such as wireless communication like infrared communication and wired communication, or as a broadcasting means/device, or the like.

The network 300 may be any network as long as it is capable of allowing data sending and receiving between the first electronic device 100 and the second electronic device 200. The network 300 may be a wireless network using an IP protocol, a wired network, or the like. Furthermore, a communication via such network may be realized in the form of terrestrial broadcasting, cable television broadcasting, satellite broadcasting, or the like. The first electronic device 100 and the second electronic device 200 may be connected in any way as long as data communication is possible between these devices. For example, instead of being connected via a network, the first electronic device 100 and the second electronic device 200 may be connected via a serial bus such as an IEEE1394 serial bus and a USB serial bus, or may be connected in accordance with High Definition Multimedia Interface (HDMI) or the like which is a standard for input/output interface for digital video and audio for Audio-Video devices.

The second electronic device 200 may be any electronic device as long as it is capable of being connected to another device via a network or the like. For example, the second electronic device 200 may be an Audio-Video device such as a television, a DVD player, a DVD recorder, a hard disk recorder, a video tape recorder, and a CD player, or may be a home appliance such as a refrigerator, a washing machine, an air-conditioner, and a lighting device.

The second operation unit 201 is an example of the operation unit that performs a predetermined operation. In the present embodiment, the second operation unit 201 has the same structure as that of the first operation unit 101 except that the second operation unit 201 performs a predetermined operation based on a control signal from the second control unit 205, and therefore its description is not given.

The second manipulation information storage unit 202 is an example of one of the following: the item information accumulation unit that accumulates a second item information indicating a menu item in the manipulation menu of the self electronic device; and the first item information accumulation unit that accumulates a first item information indicating a menu item in the manipulation menu of the self electronic device. In the present embodiment, the second manipulation information storage unit 202 has the same structure as that of the first manipulation information storage unit 102 except that the second manipulation information storage unit 202 stores the second manipulation information which is information for causing the second electronic device 200 to operate, and therefore its description is not given.

The second manipulation information sending unit 203 is an example of one of the following: the operation instruction information sending unit that sends, to any other of the electronic devices, a second item information indicating a menu item in the manipulation menu of the self electronic device; and the item information sending unit that sends, to any other of the electronic devices, a first item information indicating a menu item in the manipulation menu of the self electronic device. In the present embodiment, the second manipulation information sending unit 203 has the same structure as that of the first manipulation information sending unit 103 except that the second manipulation information sending unit 203 sends, to the first electronic device 100, manipulation information stored by the second manipulation information storage unit 202, and therefore its description is not given.

The second operation instruction information receiving unit 204 is an example of the operation instruction information receiving unit that receives operation instruction information from any other of the electronic devices. In the present embodiment, the second operation instruction information receiving unit 204 has the same structure as that of the first operation instruction information receiving unit 104 except that the second operation instruction information receiving unit 204 receives, from the first electronic device 100, operation instruction information that is information for instructing that a specified operation should be performed, and therefore its description is not given.

The second control unit 205 is an example of the control unit that causes the second operation unit 201 to operate according to the received operation instruction information. In the present embodiment, the second control unit 205 has the same structure as that of the first control unit 105 except that the second control unit 205 causes the second operation unit 201 to operate based on the operation instruction information received by the second operation instruction information receiving unit 204, and therefore its description is not given.

The second manipulation information receiving unit 206 is an example of the item information receiving unit that receives, from any other of the electronic devices, a second item information indicating a menu item in the manipulation menu of any other of the electronic devices. In the present embodiment, the second manipulation information receiving unit 206 has the same structure as that of the first manipulation information receiving unit 106 except that the second manipulation information receiving unit 206 receives, from the first electronic device 100, the first manipulation information that is information for causing the first electronic device 100 to operate, and therefore its description is not given.

The second manipulation information accumulation unit 207 is an example of one of the following: the item information accumulation unit that accumulates a first item information and a second item information, the first item information indicating a menu item in the manipulation menu of any other of the electronic devices, and the second item information indicating a menu item in the manipulation menu of the self electronic device; and the second item information accumulation unit that accumulates the received second item information indicating a menu item in the manipulation menu of any other of the electronic devices. In the present embodiment, the second manipulation information accumulation unit 207 has the same structure as that of the first manipulation information accumulation unit 107 except that the second manipulation information accumulation unit 207 accumulates, in a storage medium such as a memory, the first manipulation information received by the second manipulation information receiving unit 206, and therefore its description is not given.

The second manipulation menu display preparation unit 208 is an example of the following: the manipulation menu display preparation unit that prepares a manipulation menu of any other of the electronic devices; and the display device for displaying the prepared manipulation menu. In the present embodiment, the second manipulation menu display preparation unit 208 has the same structure as that of the first manipulation menu display preparation unit 108 except that the second manipulation menu display preparation unit 208 displays the manipulation menu based on the manipulation item information included in the first manipulation information accumulated by the second manipulation information accumulation unit 207, and therefore its description is not given.

The second operation instruction accepting unit 209 is an example of the operation instruction accepting unit that accepts, from an input device, an instruction directed to the prepared manipulation menu. In the present embodiment, the second operation instruction accepting unit 209 has the same structure as that of the first operation instruction accepting unit 109 except that the second operation instruction accepting unit 209 accepts an operation instruction that is an instruction to cause the first electronic device 100 to operate, and therefore its description is not given.

The second operation instruction information obtainment unit 210 has the same structure as that of the first operation instruction information obtainment unit 110 except that the second operation instruction information obtainment unit 210 obtains operation instruction information included in the manipulation information accumulated by the second manipulation information accumulation unit 207, and therefore its description is not given.

The second operation instruction information sending unit 211 is an example of the operation instruction information sending unit that sends, to any of the other electronic devices, an operation instruction information for causing any of the other electronic devices to perform an operation corresponding to the accepted instruction. In the present embodiment, the second operation instruction information sending unit 211 has the same structure as that of the first operation instruction information sending unit 111 except that the second operation instruction information sending unit 211 sends, to the first electronic device 100, the operation instruction information obtained by the second operation instruction information obtainment unit 210, and therefore its description is not given.

A second remote control device 220 is an example of the input device. In the present embodiment, the second remote control device 220 has the same structure as that of the first remote control device 120 except that the second remote control device 220 is intended for manipulating the second electronic device 200, and therefore its description is not given.

Next, a description is given of the operations performed in the electronic device system of the present embodiment. First, referring to the flowchart of FIG. 2, the operation performed by the first electronic device 100 is described. Note that the operation of the second electronic device 200 is not described in the present embodiment since the operation of the second electronic device 200 has the same structure as that of the first electronic device 100 and the same operation is performed except that the second operation unit 201 operates differently.

(Step S201) The first manipulation information sending unit 103, when the first electronic device 100 is powered on, obtains the first manipulation information from the first manipulation information storage unit 102, and sends the first manipulation information to another electronic device, which is the second electronic device 200 here, via the network 300. Note that the first manipulation information is sent in response to the first electronic device 100 being powered on as a trigger, but the first manipulation information may also be sent in the case where the user has requested the display of the manipulation menu. In this case, if the first electronic device 100 receives manipulation information from another device in response to the sending of this first manipulation information, it becomes possible to obtain the latest manipulation information about the electronic devices connected to the network 300 at the point in time when the manipulation menu is to be displayed. This makes it possible to eliminate the occurrence of the situation in which an electronic device corresponding to a manipulation menu is no longer on the network at the point in time when such manipulation menu is displayed. As a result, it becomes possible not to display any menus that cannot be executed by the user, i.e., menus whose manipulation target does not exist.

(Step S202) It is judged whether or not the first manipulation information receiving unit 106 has received the second manipulation information. In the case where the judgment is YES, the process proceeds to Step S203, whereas in the case where the judgment is NO, the process proceeds to Step S207.

(Step S203) The first manipulation information accumulation unit 107 obtains the first manipulation information from the first manipulation information storage unit 102, and merges this first manipulation information with the second manipulation information obtained in Step S202. Details of this merge process are described later with reference to FIG. 6.

(Step S204) It is judged whether or not the first manipulation information accumulation unit 107 has succeeded in merging the first manipulation information and the second manipulation information in Step S203. In the case where the judgment is YES, the process proceeds to Step S205, whereas in the case where the judgment is NO, the process proceeds to Step S207. Such judgment of whether or not the merge has succeeded is made based on whether or not a code indicating an error (e.g., "−1") is obtained in Step S203.

(Step S205) The first manipulation information accumulation unit 107 accumulates, in the memory or the like, the merged manipulation information obtained in Step S203.

(Step S206) The first manipulation information sending unit 103 obtains the first manipulation information from the first manipulation information storage unit 102, and sends the first manipulation information to another electronic device, which is the second electronic device 200 here, via the network 300. Here, in the case where the first manipulation information does not include the identification information of the first electronic device 100, the first manipulation information sending unit 103 adds the identification information of the first electronic device 100 to the first manipulation information, and sends the resulting first manipulation information. Note that this sending may be one-to-one sending in which a sending destination is specified or may be multicast sending in which information is sent to plural destinations. For example, in the case where the second manipulation information obtained in Step S202 includes the address of its sending source, the first manipulation information may be sent only to the electronic device which has sent the second manipulation information with such included address as a sending destination. Furthermore, the first manipulation information may be sent only to all electronic devices connected to the network 300. In Step S206, the first manipulation information is sent providing that the second electronic device 200 has newly been connected to the same network 300 in response to the first manipulation information receiving unit 106 receiving the second manipulation information in Step S202.

(Step S207) The first manipulation menu display preparation unit 108 judges whether or not an instruction to display the manipulation menu has been received. In the case where the judgment is YES, the process proceeds to Step S208, whereas in the case where the judgment is NO, the process returns to Step S202. Note that an instruction to display the manipulation menu may be accepted in any way. For example, an accepting unit or the like that accepts an instruction to display the manipulation menu is provided so as to accept such instruction through this accepting unit, or such instruction may be accepted through another processing unit.

(Step S208) The first manipulation menu display preparation unit 108 judges whether or not the merged manipulation information is accumulated in the first manipulation information accumulation unit 107. In the case where the judgment is YES, the process proceeds to Step S209, whereas in the case where the judgment is NO, the process proceeds to Step S216.

(Step S209) The first manipulation menu display preparation unit 108 displays the manipulation menu based on the merged manipulation information accumulated in the first manipulation information accumulation unit 107. Processing for displaying the manipulation menu based on the manipulation information is a known technique, and thus its description is not given here.

(Step S210) The first operation instruction accepting unit 109 judges whether or not an operation instruction has been accepted. In the case where the judgment is YES, the process proceeds to Step S211, whereas in the case where the judgment is NO, the process returns to Step S210.

(Step S211) The first operation instruction accepting unit 109 terminates the display of the manipulation menu. Note that the first operation instruction accepting unit 109 may not terminate the display of the manipulation menu here.

(Step S212) The first operation instruction information obtainment unit 110 obtains the operation instruction information, included in the merged manipulation information accumulated in the first manipulation information accumulation unit 107, corresponding to the operation instruction accepted in Step S210.

(Step S213) The first operation instruction information obtainment unit 110 judges whether not the operation instruction accepted in Step S210 is an operation instruction for the first electronic device 100. This judgment is made by, for example, checking identification information and address information of which electronic device is associated with the operation instruction information corresponding to the operation instruction and accumulated in the merged manipulation information. In the case where the above judgment is YES, the process proceeds to Step S214, whereas in the case where the judgment is NO, the process proceeds to Step S215.

(Step S214) The first control unit 105 causes the first operation unit 101 to operate based on the operation instruction information obtained in Step S212, and then returns to Step S202.

(Step S215) The first operation instruction information sending unit 111 sends the operation instruction information obtained in Step S212 to an electronic device, here the second electronic device 200, for which such operation instruction information is intended, and then returns to Step S202.

(Step S216) The first manipulation menu display preparation unit 108 displays the manipulation menu based on the first manipulation information stored in the first manipulation information storage unit 102.

(Step S217) The first operation instruction accepting unit 109 judges whether or not an operation instruction has been accepted. In the case where the judgment is YES, the process proceeds to Step S218, whereas in the case where the judgment is NO, the process proceeds to Step S217.

(Step S218) The first operation instruction accepting unit 109 terminates the display of the manipulation menu.

(Step S219) The first operation instruction information obtainment unit 110 obtains the operation instruction information, included in the first manipulation information stored in the first manipulation information storage unit 102, corresponding to the operation instruction accepted in Step S210, and then proceeds to Step S214.

Figure 2:
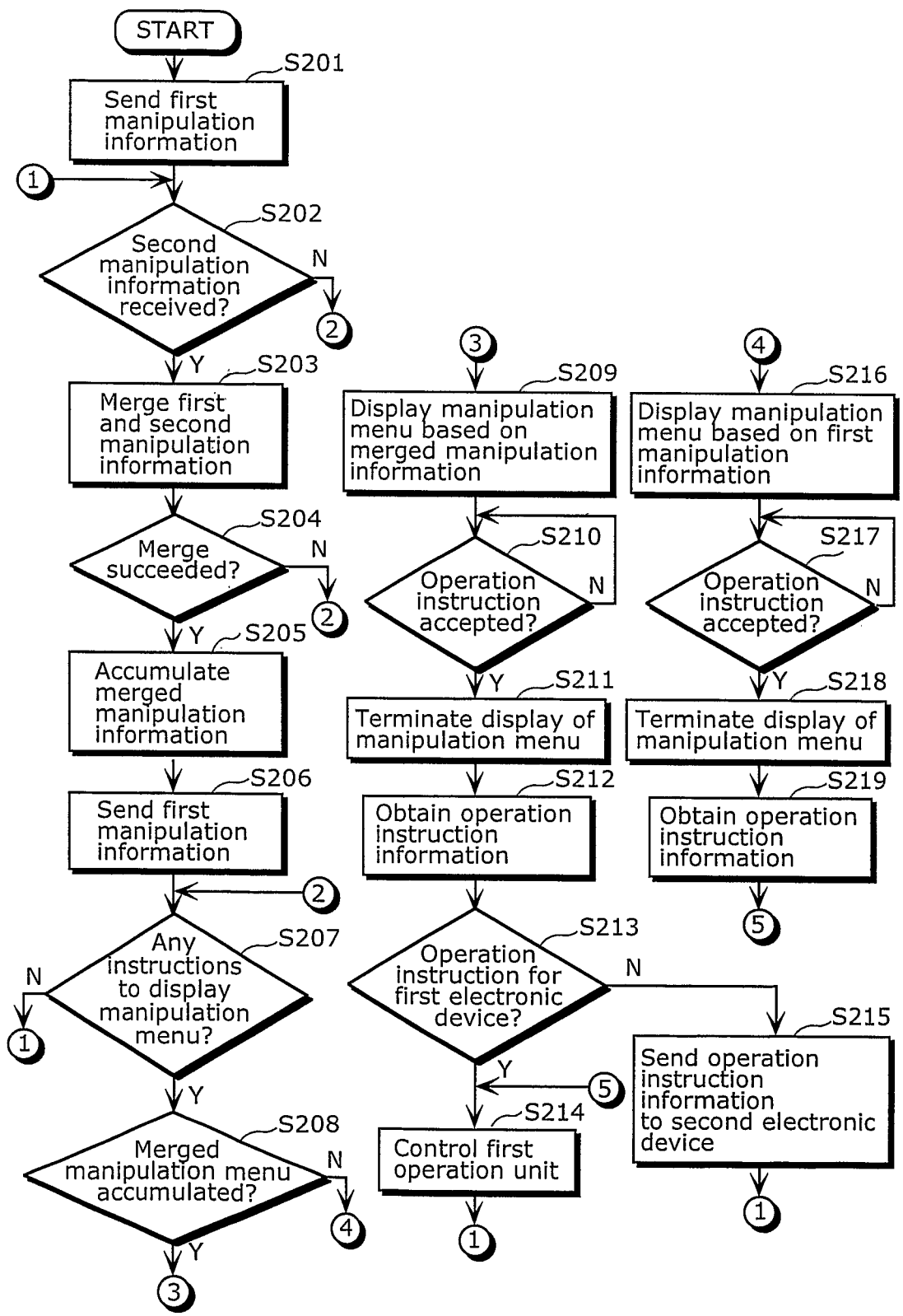
FIG. 2 is a flowchart showing an operation performed in the electronic device system.

Note that the processing shown in the flowchart of FIG. 2 is terminated in response to the power off of the first electronic device 100 or to an interruption for terminating the processing.

Note that in the present embodiment, the first manipulation information is sent to another device when the first electronic device 100 is powered on, i.e., at power on time, but it is also possible that a signal for checking the connection with another electronic device is sent to another electronic device on a regular or irregular basis, and the first manipulation information is sent to such another device only in the case where there is a response to such signal.

Next, a description is given of a concrete example of the electronic device system according to the present embodiment.

Figure 3:
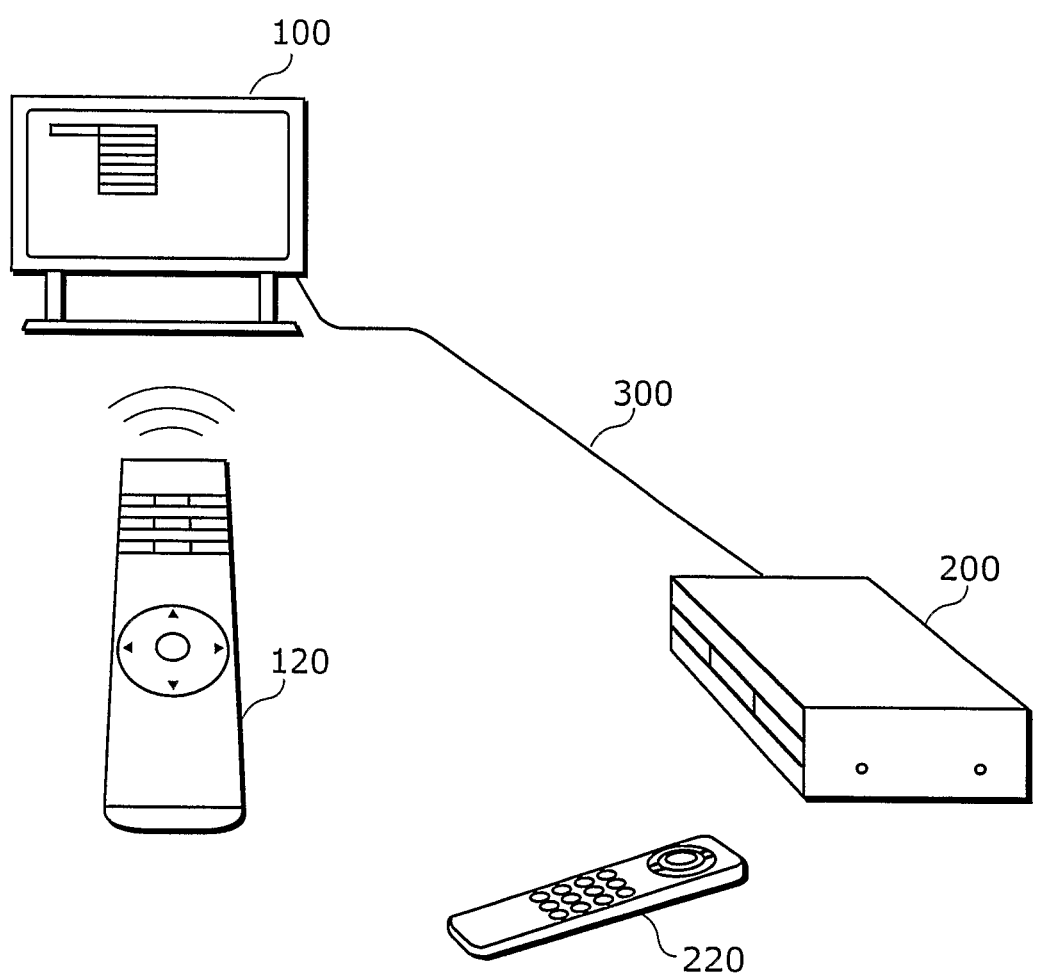
FIG. 3 is a schematic diagram showing the electronic device system.

FIG. 3 is a schematic diagram for describing a concrete example of the electronic device system according to the present embodiment. This concrete example assumes that the first electronic device 100 is a television and the second electronic device 200 is a DVD recorder, and that the first electronic device 100 and the second electronic device 200 are connected via the wired network 300 that uses an Internet protocol. It also assumes that an output of the second electronic device 200 is connected to the external input terminal of the first electronic device 100, and an output of the second electronic device 200 is displayed onto the television display by switching inputs at the first electronic device 100.

FIG. 4 is a diagram showing the data structure of the first manipulation information stored in the first manipulation information storage unit 102 of the first electronic device 100. In the first manipulation information, information in between a start tag (word bracketed by < >) and an end tag (word bracketed by </>) of "menu" is manipulation information (information in between a start tag and an end tag is hereinafter referred to simply as "information between the tags"). Information between the tags of "menu title" indicates which device this manipulation information belongs to. Here, it indicates that the manipulation information belongs to "television". Information between the tags of "IP address" indicates an IP address of an electronic device for which this manipulation information is intended, i.e., the IP address of the first electronic device 100 here. Information between the tags of "item" is manipulation item information. Information between the tags of "button" is item information indicating an item of the manipulation menu. Information between the tags of "command" is operation instruction information, intended for the first electronic device 100, corresponding to the item information.

FIG. 5 is a diagram showing the data structure of the second manipulation information stored in the second manipulation information storage unit 202 of the second electronic device 200. Tags shown in FIG. 5 that are the same as those shown in FIG. 4 are the same as or equivalent to the tags shown in FIG. 4.

The user connects a newly purchased second electronic device 200 to the first electronic device 100 at home via the network 300, and powers on these devices. From the first electronic device 100, the first manipulation information as shown in FIG. 4 is sent to the second electronic device 200 connected via the network. From the second electronic device 200, the second manipulation information as shown in FIG. 5 is sent to the first electronic device 100 connected via the network.

The first manipulation information accumulation unit 107 of the first electronic device 100, which has received the second manipulation information, merges such second manipulation information with the first manipulation information stored in the first manipulation information storage unit 102 to generate manipulation information (hereinafter referred to as "merged manipulation information").

Figure 6:
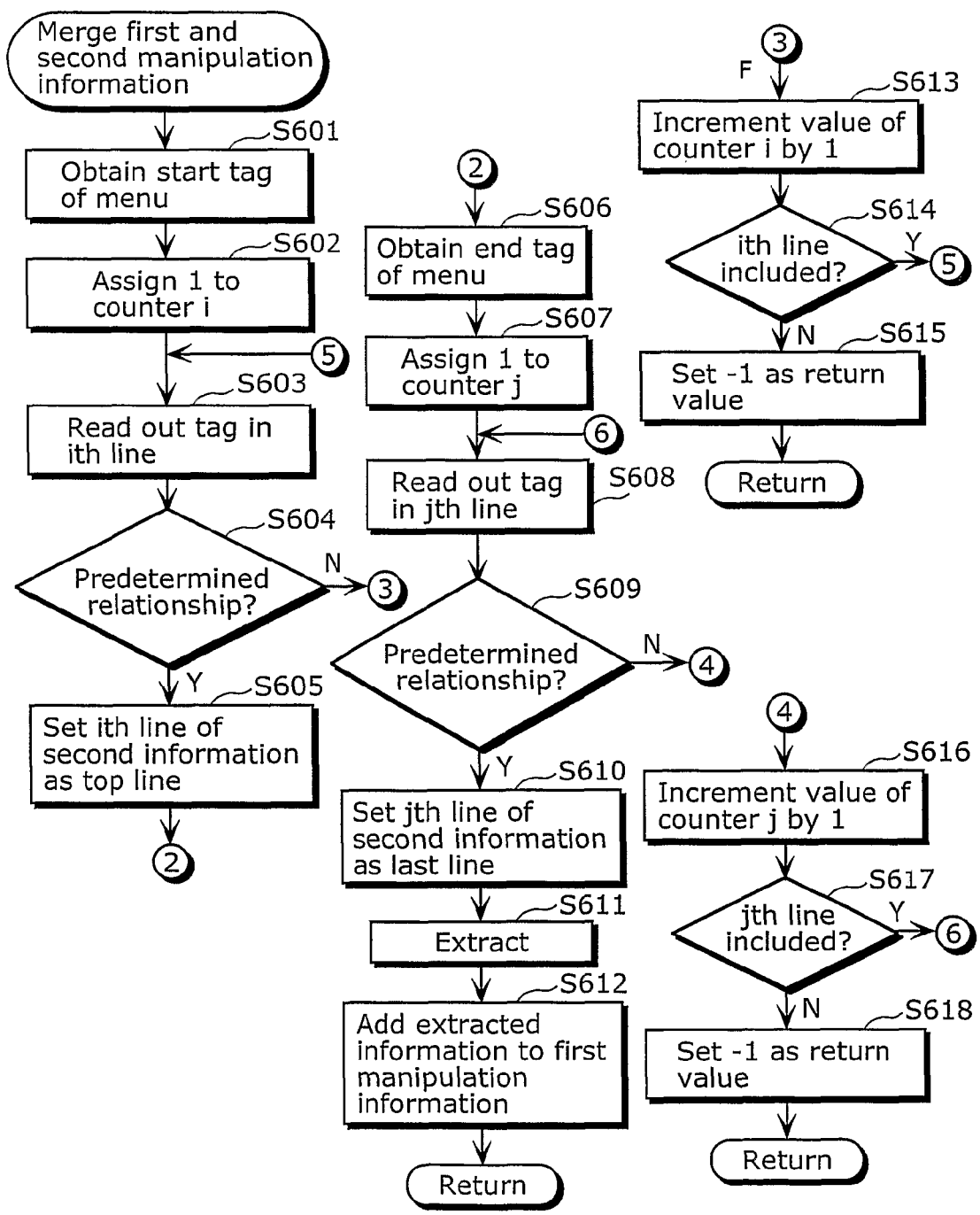
FIG. 6 is a' flowchart showing an operation performed in the electronic device system.

Referring to the flowchart of FIG. 6, the following describes an example of the above-described process of Step S203, shown in FIG. 2, performed by the first manipulation information accumulation unit 107 for generating merged manipulation information.

(Step S601) The first manipulation information accumulation unit 107 reads, from the memory or the like, the start tag of "menu" which is predetermined information for obtaining manipulation information.

(Step S602) The first manipulation information accumulation unit 107 assigns 1 to a counter i.

(Step S603) The first manipulation information accumulation unit 107 reads a tag in the ith line of the second manipulation information.

(Step S604) The first manipulation information accumulation unit 107 judges whether or not the tag read in Step S601 and the tag read in Step S603 are in a predetermined relationship, here whether these two tags match or not. In the case where the judgment is YES, the process proceeds to Step S605, whereas in the case whether the judgment is NO, the process jumps to Step S613.

(Step S605) The first manipulation information accumulation unit 107 sets the ith line of the second manipulation information as the top line from which the manipulation information is to be extracted.

(Step S606) The first manipulation information accumulation unit 107 reads, from the memory or the like, the end tag of "menu" which is predetermined information for obtaining the manipulation information.

(Step S607) The first manipulation information accumulation unit 107 assigns 1 to a counter j.

(Step S608) The first manipulation information accumulation unit 107 reads a tag in the jth line of the second manipulation information.

(Step S609) The first manipulation information accumulation unit 107 judges whether or not the tag read in Step S606 and the tag read in Step S608 are in a predetermined relationship, here whether these two tags match or not. In the case where the judgment is YES, the process proceeds to Step S610, whereas in the case when the judgment is NO, the process jumps to Step S616.

(Step S610) The first manipulation information accumulation unit 107 sets the jth line of the second manipulation information as the last line to which the manipulation information is to be extracted.

(Step S611) The first manipulation information accumulation unit 107 extracts manipulation information, from the second manipulation information, beginning with the top line set in Step S605 through to the last line set in Step S610.

(Step S612) The first manipulation information accumulation unit 107 obtains the first manipulation information from the first manipulation information storage unit 102, and adds the manipulation information extracted in Step S611 after the last line of such obtained first manipulation information, so as to obtain merged manipulation information. The operating procedures return to the calling function.

(Step S613) The first manipulation information accumulation unit 107 increments the value of the counter i by 1.

(Step S614) The first manipulation information accumulation unit 107 judges whether or not the ith line is included in the second manipulation information. In the case where the judgment is YES, the process returns to Step S603, whereas in the case where the judgment is NO, the process proceeds to Step S615.

(Step S615) "−1" is set as a return value. "−1" is a code indicating that the merge of the first and second manipulation information has not been successful, i.e., a code indicating an error. The operating procedures return to the calling function, and then returns to the calling function.

(Step S616) The first manipulation information accumulation unit 107 increments the value of the counter j by 1.

(Step S617) The first manipulation information accumulation unit 107 judges whether or not the jth line is included in the second manipulation information. In the case where the judgment is YES, the process returns to Step S608, whereas in the case where the judgment is NO, the process proceeds to Step S618.

(Step S618) "−1" is set as a return value. "−1" is a code indicating an error. The operating procedures return to the calling function, and then returns to the calling function.

In the present example, the merged manipulation information is generated, through the above-described processes, by extracting information between the tags of "menu" in the second manipulation information, and then by adding such extracted information after the end tag of "menu" in the first manipulation information. FIG. 7 is a diagram showing the data structure of the merged manipulation information generated in the above-described manner.

The second manipulation information accumulation unit 207 of the second electronic device 200 that has received the first manipulation information also accumulates the merged manipulation information generated by merging the first manipulation information and the second manipulation information.

Figure 8:
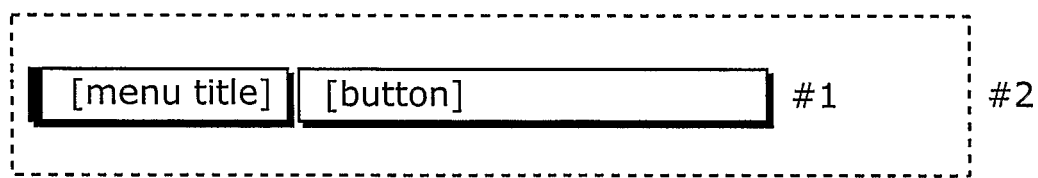
FIG. 8 is a diagram showing model information of a manipulation menu in the electronic device system.

Next, a description is given of processing performed by the first manipulation menu display preparation unit 108 for constructing a manipulation menu for display. The first manipulation menu display preparation unit 108 has model information as shown in FIG. 8. The model information is a style file that is used when constructing a manipulation menu. In the model information, "[ ]" indicates a variable. "[menu title]" indicates that information between the tags of "<menu title>" in manipulation information is inserted there. "[button]" indicates that information between the tags of "<button>" in manipulation information is inserted there. "#1" next to "[button]" indicates that "[button]" repeatedly appears as many as the number of manipulation items. An area enclosed by the dotted lines next to which #2 is indicated, indicates that information in this area enclosed by the dotted lines appears repeatedly as many as the number of menu titles included in the manipulation information. Note that the display of the manipulation menu based on the manipulation information may be performed using a known technique for controlling the display of line elements and block elements of HTML and XML. Also note that in the present embodiment, the manipulation menu may be displayed in any structures or in any forms. For example, the manipulation menu may be displayed as a menu having a hierarchical structure. Alternatively, all menu items in the manipulation menu may be displayed only in text form, or may be displayed in the form of buttons customized by the user.

Figure 9:
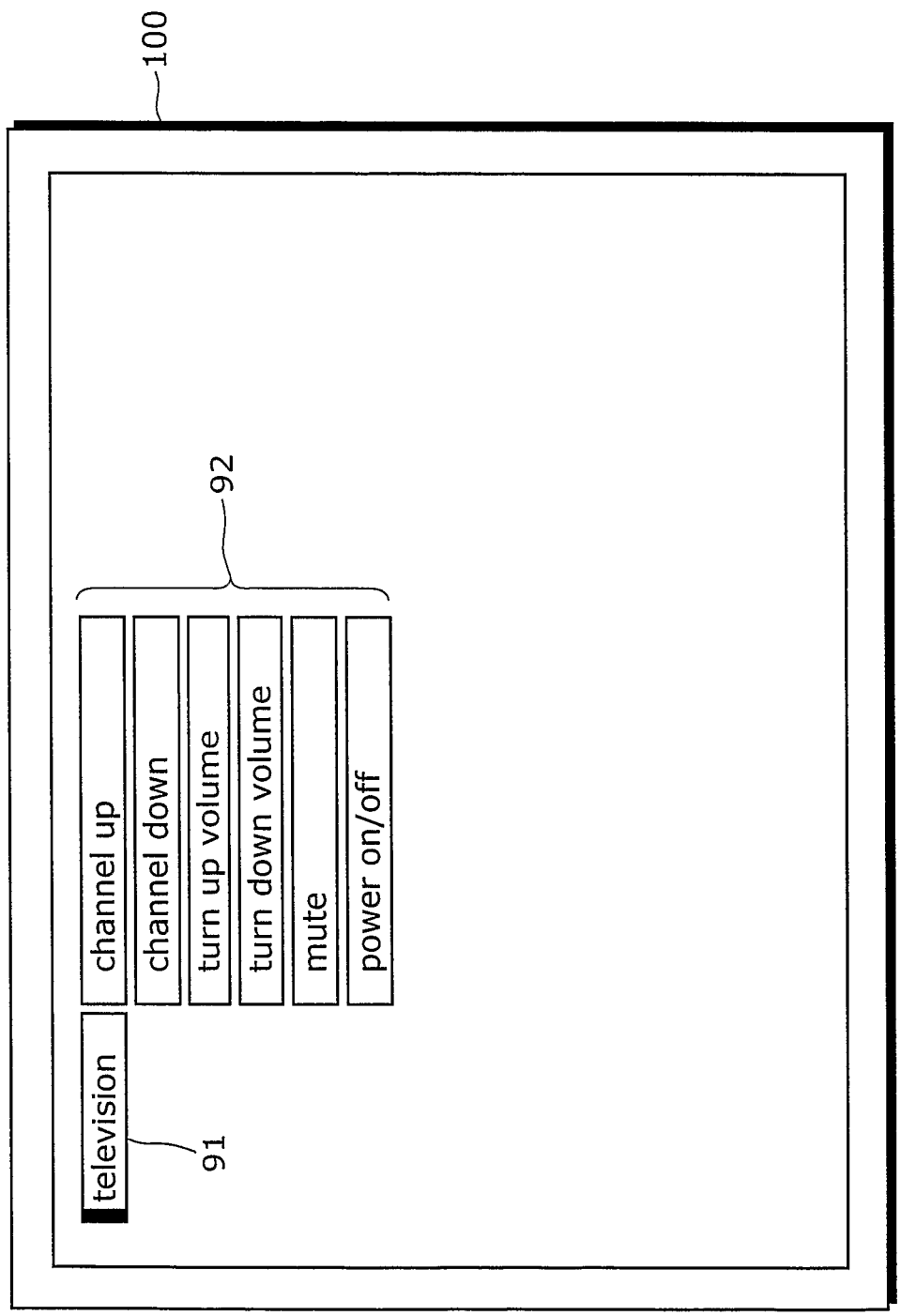
FIG. 9 is a diagram showing an example display of a manipulation menu in the electronic device system.

In the case where the user uses only the first electronic device 100, and such user calls the manipulation menu using the first remote control device 120 or the like, a menu screen as shown in FIG. 9 is displayed on the display of the first electronic device 100, based on the first manipulation information shown in FIG. 4. As shown in FIG. 9, "television", which is the information between the tags of "menu title", is displayed as the title of the menu, as represented by a displayed item 91 shown in FIG. 9. Furthermore, the information between the tags of each "button" is displayed as an item 92 of the manipulation menu.

Figure 10:
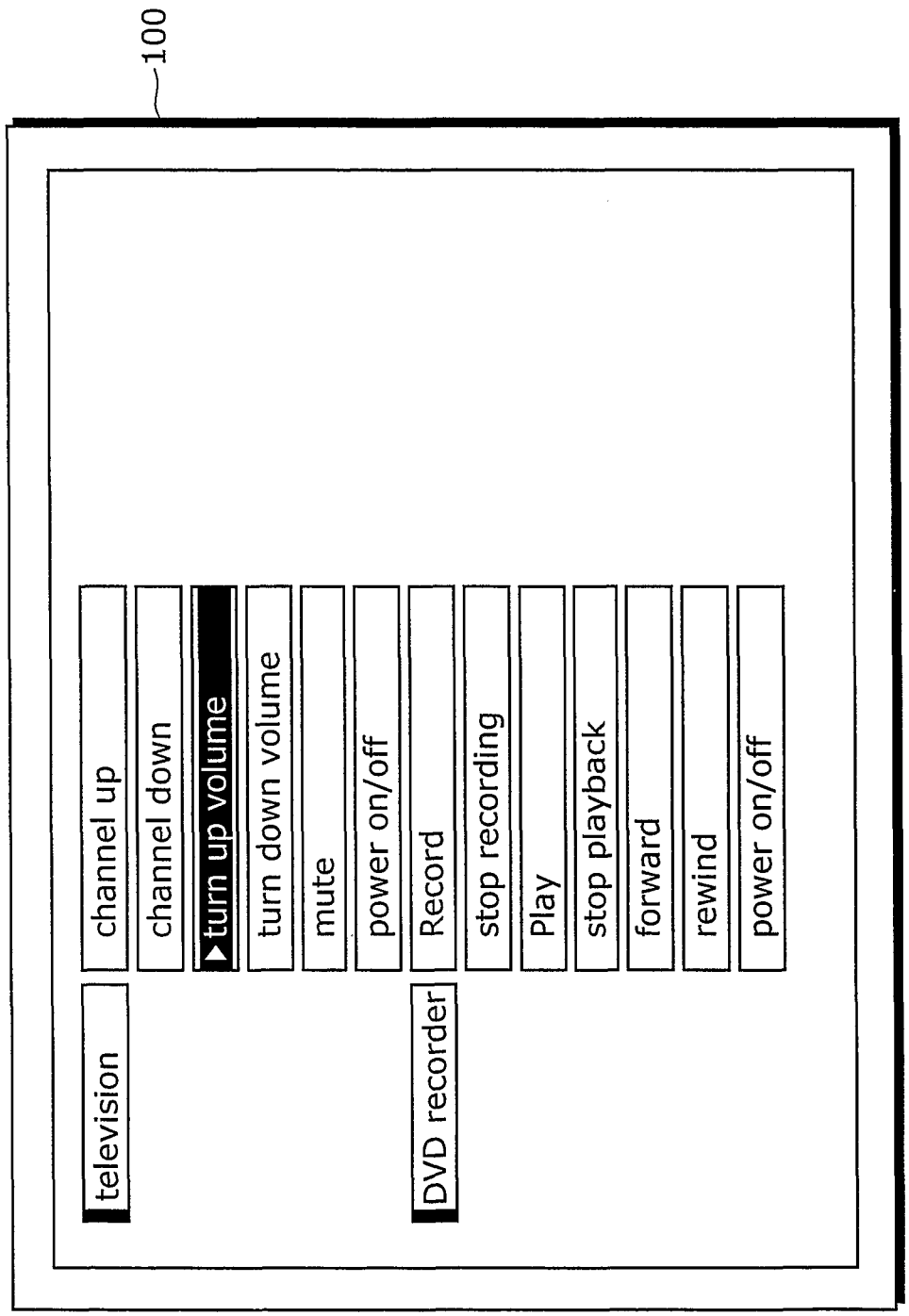
FIG. 10 is a diagram showing an example display of a manipulation menu in the electronic device system.

In the case where the user connects the second electronic device 200 to the first electronic device 100 via the network 300, and such user calls the manipulation menu using the first remote control device 120 or the like, a menu screen as shown in FIG. 10 is displayed on the display of the first electronic device 100, based on the merged manipulation information shown in FIG. 7. As shown in FIG. 10, the menu of "DVD recorder" is newly added to the menu of "television" shown in FIG. 9.

Then, when the user selects, as shown in FIG. 10, "turn up volume" included in the items of the manipulation menu of "television", for example, from all the items of the merged manipulation menu, by operating a cursor button or the like of the first remote control device 120, the first operation instruction information obtainment unit 110 detects, from the information between the tags of "menu" whose "menu title" is "television", a "button" tag whose information between the tags is "turn up volume", and then obtains the information between the tags of "command" in the "item" tag which includes such detected "button" tag (such information between the tags of "command" is the operation instruction information "volume_UP"). The first operation instruction information obtainment unit 110 then sends such obtained operation instruction information to an electronic device with the IP address indicated by the information between the tags of "IP address". Here, since such IP address is that of the first electronic device 100 itself, the operation instruction information is sent to the first control unit 105 without being sent to outside. Then, the first operation unit 101 is controlled based on such operation instruction information to turn the volume up. Note that it is also possible that serial numbers are assigned to the heads of the respective items in the manipulation menu, thereby allowing an item of the manipulation menu to be selected by inputting the corresponding serial number using a ten key pad or the like of the first remote control device 120.

Furthermore, when "recording" in the menu of "DVD player" is selected from among all items in the merged manipulation menu, for example, the first operation instruction information obtainment unit 110 detects, from the information between the tags of "menu" whose "menu title" is "DVD player", a "button" tag whose information between the tags is "recording" is detected, and then obtains the information between the tags of "command" in the "item" tag which includes such detected "button" tag (such information between the tags of "command" is the operation instruction information "record_START"). The first operation instruction information obtainment unit 110 then sends such obtained operation instruction information to an electronic device with the IP address indicated by the information between the tags of "IP address". Here, since such IP address is that of the second electronic device 200, "record_START" is sent to the second electronic device 200 via the network 300.

The operation instruction information "record_START" is received by the second operation instruction information receiving unit 204 of the second electronic device 200. Then, the second control unit 205 controls the second operation unit 201 based on the operation instruction information "record_START", such that the recording of video being displayed on the first electronic device 100 starts.

Here, suppose that the user switches inputs of the first electronic device 100 so that an output of the second electronic device 200 is displayed on the display of the first electronic device 100. In this case, the user causes the manipulation menu to be displayed using the second remote control device 220. In the second electronic device 200, since the merged manipulation information generated by merging the first manipulation information and the second manipulation information is accumulated in the second manipulation information accumulation unit 207, as in the case of the first electronic device 100, the television menu is displayed in addition to the DVD player menu, as shown in FIG. 11. This makes it possible for the television to be manipulated from the DVD player, i.e., the second electronic device 200.

As described above, according to the present embodiment, it is possible to control the manipulation of the first electronic device and the second electronic device connected via a network or the like from any of the first electronic device and the second electronic device. Even in the case where one of the electronic devices cannot be directly controlled due to such reasons as that a remote control device for manipulating such electronic device cannot be found, it becomes possible to control such device from the other electronic device, as a result of which a highly convenient electronic device system can be provided. What is more, it becomes not necessary to switch to another remote control device or the like every time an electronic device to be manipulated changes, as a result of which operability is improved.

Furthermore, since the user is not required to be aware of the switching or the like between plural devices, operability is further improved.

Furthermore, since the manipulation menus of two electronic devices are merged to be displayed on one of the electronic device, it becomes possible to manipulate these two electronic devices from any of the devices via the same interface. This eliminates the user's trouble of having to remember a new manipulation method every time an electronic device s/he wishes to manipulate changes, and thus allows such user to manipulate the electronic device in an intuitive manner under the same familiar operational feeling.

Furthermore, each of the remote control devices is capable of manipulating plural electronic devices as long as it includes means/device for shifting to another item of the menu such as arrow keys and a ten key pad, as well as including a key or the like for determining the selection of a menu item. This makes it possible for the remote control devices not to newly include or to be allocated with a key or the like for manipulating a function unique to each device, and thus the structure of the remote control devices is simplified.

Note that the present embodiment describes the case where two electronic devices, the first electronic device 100 and the second electronic device 200, are used, but the present invention is applicable also to the case where three or more electronic devices are connected. In this case, when any of such electronic devices becomes out of order, another of the electronic devices can be manipulated from the other electronic device(s).

Furthermore, in the present embodiment, operation instruction information is sent to another electronic device, but it is also possible that an item in the manipulation menu, i.e., item information itself is sent to the other electronic device, and such receiving electronic device obtains operation instruction information corresponding to such item information. Furthermore, operation instruction information may be used as an item in the manipulation menu. For example, in the case where operation instruction information is "record_START", "record_START" may be displayed as an item of the manipulation menu.

Furthermore, in the present embodiment, the first manipulation information accumulation unit 107 may accumulate the second manipulation information without merging it with the first manipulation information, and the first manipulation menu display preparation unit 108 may merge a manipulation menu that is based on the accumulated second manipulation information with a menu that is based on the first manipulation information at the time of manipulation menu display, and display the resulting menu.

Furthermore, in the present embodiment, the first manipulation menu display preparation unit 108 and the second manipulation menu display preparation unit 208 may be omitted in the case where there is no need to display any manipulation menus. For example, in the case where the first operation instruction accepting unit 109 and the second operation instruction accepting unit 209 further include plural spare buttons in addition to buttons necessary for their respective operations, it is possible to manipulate the first electronic device and the second electronic device without displaying any manipulation menus, by assigning items of the manipulation menus to such spare buttons.

Furthermore, in the present embodiment, processes (functions) may be realized by a single device (system) executing them in a centralized manner, or may be realized by plural devices executing them in a decentralized manner.

Furthermore, in the present embodiment, each of the components may be constructed as dedicated hardware. Components that can be implemented as software may be implemented by the execution of a program. For example, each of the components can be implemented by a program execution unit such as a CPU reading out and executing a software program stored on a storage medium such as a hard disk and a semiconductor memory. Note that software realizing the information processing device in the aforementioned embodiment is a program such as:

a computer program stored on a computer readable medium of an electronic device that communicates with other electronic devices, the computer program including: computer executable program code that causes a computer to prepare a manipulation menu of any of the other electronic devices; computer executable program code that causes the computer to accept, from an input device, an instruction directed to the prepared manipulation menu; and computer executable program code that causes the computer to send, to any of the other electronic devices, an operation instruction information for causing any of the other electronic devices to perform an operation corresponding to the accepted instruction; and a computer program stored on a computer readable medium of an electronic device that communicates with other electronic devices, the computer program including: computer executable program code that causes a computer to accumulate a first item information indicating a menu item in a manipulation menu of the electronic device; computer executable program code that causes a computer to send, to any of the other electronic devices, the accumulated first item information;

computer executable program code that causes a computer to receive, from any of the other electronic devices, a second item information indicating a menu item in a manipulation menu of any of the other electronic devices; computer executable program code that causes a computer to accumulate the received second item information; computer executable program code that causes a computer to prepare a manipulation menu based on the accumulated first item information and the accumulated second item information; computer executable program code that causes a computer to accept, from an input device, an instruction directed to the prepared manipulation menu; and computer executable program code that causes a computer to send, to any of the other electronic devices, an operation instruction information for causing any of the other electronic devices to perform an operation corresponding to the accepted instruction.

Note that the sending of information and the receiving of information in the above-described program do not include any processes executed by hardware (processes executed only by hardware), e.g., a process, in the sending of information, executed by a modem or an interface card.

Furthermore, the above program may be executed by a server or the like downloading such program, or may be stored on a predetermined storage medium (e.g., an optical disc such as a CD-ROM, as well as a magnetic disc and a semiconductor memory) and executed by being read out from such storage medium.

Furthermore, a single computer or plural computers may execute the above program. In other words, the program may be executed either in a centralized or decentralized manner.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is effective for use as an electronic device system including plural electronic devices, and particularly optimal for use as an electronic device system composed of electronic devices, such as Audio-Video devices and home appliances, that are connected via a network.

The invention claimed is:

1. An electronic device system constituted by a plurality of electronic devices capable of communicating with each other, each electronic device comprising:

a manipulation menu preparation unit operable to prepare a manipulation menu of any other electronic device of said plurality of electronic devices that constitute said electronic device system, by receiving information regarding the manipulation menu of said other electronic device from said other electronic device;

a display unit operable to display the manipulation menu of said other electronic device prepared by said manipulation menu preparation unit together with a manipulation menu of said electronic device;

a selection accepting unit operable to select one item included in the manipulation menu of said electronic device or other electronic device displayed by said display unit;

a selection information sending unit operable to send, to said other electronic device, information regarding one item included in the manipulation menu of said other electronic device, when the one item included in the manipulation menu of said other electronic device is selected by said selection accepting unit;

a manipulation menu information sending unit operable to send information regarding the manipulation menu of said electronic device to said other electronic device;

an operation unit operable to perform a predetermined operation;

a selection information receiving unit operable to receive, from said other electronic device, information regarding one item included in the manipulation menu of said electronic device; and a control unit operable to cause said operation unit to operate according to the information regarding one item included in the manipulation menu of said electronic device received by said selection information receiving unit, wherein said manipulation menu information sending unit is operable to send, to said other electronic device, a signal for checking a connection with said other electronic device on a regular or irregular basis, and when a response is received from said other electronic device, send the information regarding the manipulation menu of said electronic device to said other electronic device;

wherein said manipulation menu information sending unit is further operable to multicast, to said plurality of electronic devices, information obtained by adding identification information of said electronic device to the information regarding the manipulation menu of said electronic device; and wherein said manipulation menu information sending unit is further operable to send the information regarding the manipulation menu of said electronic device using identification information of said other electronic device as a sending destination when the identification information is included in the information regarding the manipulation menu of said other electronic device received from said other electronic device.

2. The electronic device system according to claim 1, wherein each respective electronic device of said plurality of electronic devices comprises:

an item information accumulation unit operable to accumulate first item information and second item information, the first item information indicating a menu item in the manipulation menu of any of said electronic devices, and the second item information indicating a menu item in the manipulation menu of said respective electronic device;

wherein said manipulation menu display preparation unit is operable to merge the first item information and the second item information accumulated in said item information accumulation unit, and to prepare a manipulation menu corresponding to the merged item information.

3. The electronic device system according to claim 2, wherein said selection information sending unit is further operable to send the second item information to any of said electronic devices.

4. The electronic device system according to claim 1, further comprising one of a wireless network, a wired network, terrestrial broadcasting, cable television broadcasting, satellite broadcasting, a serial bus and a high definition multimedia interface for enabling said plurality of electronic devices to communicate with each other.

5. The electronic device system according to claim 1, wherein the input device is one of a remote control device, a touch panel, a hard button, a ten key pad, a keyboard and a mouse.

6. The electronic device system according to claim 1, wherein each of said electronic devices is one of a television, a DVD player, a DVD recorder, a hard disk recorder, a video tape recorder, a CD player, a refrigerator, a washing machine, an air conditioner and a lighting device.

7. The electronic device system according to claim 1, wherein said manipulation menu information sending unit is further operable to send the information regarding the manipulation menu of said electronic device to said other electronic device, when a request is made, in the menu with a hierarchical structure, to send the information regarding the manipulation menu of said electronic device to said other electronic device.

8. The electronic device system according to claim 1, wherein said display unit is further operable to select displaying the manipulation menu of said electronic device or displaying the manipulation menu of said other electronic device, and when displaying the manipulation menu of the electronic device is selected, said display unit displays, on a single screen, the manipulation menu of said electronic device and the manipulation menu of said other electronic device in this order, while, when displaying the manipulation menu of said other electronic device is selected, said display unit displays, on the single screen, the manipulation menu of said other electronic device and the manipulation menu of said electronic device in this order.

9. The electronic device system according to claim 1, further comprising a spare button in addition to a button necessary for an operation of said electronic device, wherein said display unit is further operable to display the manipulation menu of said other electronic device without displaying the manipulation menu of said electronic device by assigning items of the manipulation menu to the spare button.

10. An electronic device for use with a plurality of other electronic devices, and capable of communicating with any other electronic device from among the plurality of other electronic devices, said electronic device comprising:

a manipulation menu preparation unit operable to prepare a manipulation menu of any of the other electronic devices by receiving information regarding the manipulation menu of said other electronic device from the other electronic device;

a display unit operable to display the manipulation menu of said other electronic device prepared by said manipulation menu preparation unit together with a manipulation menu of said electronic device;

a selection accepting unit operable to select one item included in the manipulation menu of said electronic device or other electronic device displayed by said display unit;

a selection information sending unit operable to send, to the other electronic device, information regarding one item included in the manipulation menu of said other electronic device, when the one item included in the manipulation menu of said other electronic device is selected by said selection accepting unit;

a manipulation menu information sending unit operable to send information regarding the manipulation menu of said electronic device to the other electronic device;

an operation unit operable to perform a predetermined operation;

a selection information receiving unit operable to receive, from said other electronic device, information regarding one item included in the manipulation menu of said electronic device; and a control unit operable to cause said operation unit to operate according to the information regarding one item included in the manipulation menu of said electronic device received by said selection information receiving unit, wherein said manipulation menu information sending unit is operable to send, to said other electronic device, a signal for checking a connection with said other electronic device on a regular or irregular basis, and when a response is received from said other electronic device, send the information regarding the manipulation menu of said electronic device to said other electronic device;

wherein said manipulation menu information sending unit is further operable to multicast, to said plurality of electronic devices, information obtained by adding identification information of said electronic device to the information regarding the manipulation menu of said electronic device; and wherein said manipulation menu information sending unit is further operable to send the information regarding the manipulation menu of said electronic device using identification information of said other electronic device as a sending destination when the identification information is included in the information regarding the manipulation menu of said other electronic device received from said other electronic device.

11. A non-transitory computer readable storage medium storing a computer program of an electronic device for use with a plurality of other electronic devices and capable of communicating with any other electronic device from among the plurality of other electronic devices, said computer program comprising:

computer executable program code operable to cause a computer to prepare a manipulation menu of any of the other electronic devices by receiving information regarding the manipulation menu of said other electronic device from the other electronic device;

computer executable program code operable to cause a computer to display the manipulation menu of said other electronic device together with a manipulation menu of the electronic device that includes the computer readable medium on which the computer program is stored;

computer executable program code operable to cause a computer to select one item included in the displayed manipulation menu of said electronic device or other electronic device;

computer executable program code operable to cause a computer to send, to the other electronic device, information regarding one item included in the manipulation menu of said other electronic device, when the one item included in the manipulation menu of said other electronic device is selected;

computer executable program code operable to cause a computer to send information regarding the manipulation menu of the electronic device to the other electronic device;

computer executable program code operable to cause a computer to perform a predetermined operation;

computer executable program code operable to cause a computer to receive, from said other electronic device, information regarding one item included in the manipulation menu of said electronic device; and computer executable program code operable to cause a computer to operate according to the information regarding one item included in the received manipulation menu of said electronic device, wherein said computer executable program code operable to cause the computer to send information regarding the manipulation menu is operable to send, to said other electronic device, a signal for checking a connection with said other electronic device on a regular or irregular basis, and when a response is received from said other electronic device, send the information regarding the manipulation menu of said electronic device to said other electronic device;

wherein said computer executable program code operable to cause the computer to send information regarding the manipulation menu is further operable to multicast, to said plurality of electronic devices, information obtained by adding identification information of said electronic device to the information regarding the manipulation menu of said electronic device; and wherein said computer executable program code operable to cause the computer to send information regarding the manipulation menu is further operable to send the information regarding the manipulation menu of said electronic device using identification information of said other electronic device as a sending destination when the identification information is included in the information regarding the manipulation menu of said other electronic device received from said other electronic device.

* * * * *